United States Patent
Dahlstrom et al.

(10) Patent No.: US 10,148,761 B2
(45) Date of Patent: Dec. 4, 2018

(54) SYSTEM-ON-CHIP DATA SECURITY APPLIANCE AND METHODS OF OPERATING THE SAME

(71) Applicant: Web Sensing, LLC, Hanover, NH (US)

(72) Inventors: Jason Dahlstrom, White River Junction, VT (US); Stephen Taylor, Hanover, NH (US)

(73) Assignee: WEB SENSING, LLC, Hanover, NH (US)

( * ) Notice: Subject to any disclaimer, the term of this patent is extended or adjusted under 35 U.S.C. 154(b) by 162 days.

(21) Appl. No.: 15/077,519

(22) Filed: Mar. 22, 2016

(65) Prior Publication Data

US 2016/0301671 A1 Oct. 13, 2016

Related U.S. Application Data

(60) Provisional application No. 62/145,353, filed on Apr. 9, 2015, provisional application No. 62/152,627, filed on Apr. 24, 2015.

(51) Int. Cl.
*G06F 9/00* (2006.01)
*H04L 29/08* (2006.01)
(Continued)

(52) U.S. Cl.
CPC .......... *H04L 67/125* (2013.01); *G06F 9/4401* (2013.01); *G06F 9/4406* (2013.01);
(Continued)

(58) Field of Classification Search
CPC ............................. H04L 63/06; H04L 63/0428
See application file for complete search history.

(56) References Cited

U.S. PATENT DOCUMENTS

| 4,657,179 A | 4/1987 | Aggers et al. |
| 4,742,475 A | 5/1988 | Kaiser et al. |

(Continued)

OTHER PUBLICATIONS

Allen-Bradley, 1747-SDN DeviceNet Sanner Module, Jun. 2007, Rockwell Automation, Catalog No. 1747-SDN, Series C, 160 pages.

(Continued)

*Primary Examiner* — Zachary K Huson
(74) *Attorney, Agent, or Firm* — Michael Best & Friedrich LLP

(57) ABSTRACT

System-on-chip data security appliance ("SoC-DSA") and methods of operating the same. In one embodiment, the SoC-DSA includes data security mechanisms enclosed within a protected boundary of a single chip. In some embodiments, isolation and access control features are hidden within an on-chip field-programmable gate array ("FPGA"). The isolation and access control features can be implemented such that they are not visible to or alterable by software executing on the processing cores of the SoC-DSA, which provides for continued data security even in the presence of software exploitation, such as a malicious implant, that otherwise compromises data security in software-only systems. The SoC-DSA can be used to enhance data security in existing data security devices and protocols, such as high assurance guards ("HAG") and can be used to create new types of security devices, such as devices enforce alternative human data interactions ("HDI") models.

24 Claims, 5 Drawing Sheets

(51) Int. Cl.
*G06F 9/4401* (2018.01)
*H04L 29/06* (2006.01)

(52) U.S. Cl.
CPC ...... *H04L 63/0414* (2013.01); *H04L 63/0428* (2013.01); *H04L 63/06* (2013.01)

(56) References Cited

U.S. PATENT DOCUMENTS

| | | | |
|---|---|---|---|
| 4,845,486 A | 7/1989 | Knight et al. | |
| 5,090,242 A | 2/1992 | Hilton | |
| 5,224,648 A | 7/1993 | Simon et al. | |
| 5,544,036 A | 8/1996 | Brown, Jr. et al. | |
| 5,595,342 A | 1/1997 | McNair et al. | |
| 5,619,560 A | 4/1997 | Shea | |
| 5,635,896 A | 6/1997 | Tinsley et al. | |
| 5,708,424 A | 1/1998 | Orlando et al. | |
| 5,802,467 A | 9/1998 | Salazar et al. | |
| 6,385,510 B1 | 5/2002 | Hoog et al. | |
| 6,564,632 B2 | 5/2003 | Ross, Jr. | |
| 6,619,055 B1 | 9/2003 | Addy | |
| 6,619,555 B2 | 9/2003 | Rosen | |
| 6,622,925 B2 | 9/2003 | Carner et al. | |
| 6,715,514 B2 | 4/2004 | Parker, III et al. | |
| 6,798,341 B1 | 9/2004 | Eckel et al. | |
| 6,874,085 B1 | 3/2005 | Koo et al. | |
| 7,039,810 B1 | 5/2006 | Nichols | |
| 7,055,759 B2 | 6/2006 | Wacker et al. | |
| 7,092,891 B2 | 8/2006 | Maus et al. | |
| 7,155,349 B1 | 12/2006 | Souluer | |
| 7,289,887 B2 | 10/2007 | Rodgers | |
| 7,333,921 B2 | 2/2008 | Taylor et al. | |
| 7,424,437 B2 | 9/2008 | Maus et al. | |
| 7,516,082 B2 | 4/2009 | Sanville et al. | |
| 7,533,703 B2 | 5/2009 | Shuey | |
| 7,605,714 B2 | 10/2009 | Thompson et al. | |
| 7,702,424 B2 | 4/2010 | Cannon et al. | |
| 7,944,352 B2 | 5/2011 | Drake et al. | |
| 8,079,245 B1 | 12/2011 | Owens et al. | |
| 8,161,529 B1 | 4/2012 | Bortz et al. | |
| 8,620,841 B1 | 12/2013 | Filson et al. | |
| 8,694,600 B2 | 4/2014 | Gaines et al. | |
| 8,843,997 B1 | 9/2014 | Hare | |
| 8,943,168 B2 | 1/2015 | Wiesner et al. | |
| 2001/0045892 A1 | 11/2001 | Thomas et al. | |
| 2002/0088278 A1 | 7/2002 | Ross | |
| 2003/0084720 A1 | 5/2003 | Ross | |
| 2004/0078229 A1 | 4/2004 | Gay et al. | |
| 2005/0043907 A1 | 2/2005 | Eckel | |
| 2005/0194456 A1 | 9/2005 | Tessier et al. | |
| 2005/0270151 A1 | 12/2005 | Winick | |
| 2006/0026039 A1 | 2/2006 | Shoenhair et al. | |
| 2006/0105697 A1 | 5/2006 | Aronstam et al. | |
| 2008/0208914 A1 | 8/2008 | Navani | |
| 2010/0071054 A1* | 3/2010 | Hart | H04L 63/1416 726/13 |
| 2010/0265329 A1 | 10/2010 | Doneker | |
| 2012/0154126 A1 | 6/2012 | Cohn et al. | |
| 2012/0262303 A1 | 10/2012 | Fahey | |
| 2014/0217729 A1 | 8/2014 | Zaib et al. | |
| 2016/0063279 A1* | 3/2016 | Hars | G06F 21/64 713/190 |

OTHER PUBLICATIONS

Gould, "The PLC Gets Small," Automotive Design and Production, Aug. 1, 2004, 5 pages.

\* cited by examiner

SYSTEM-ON-CHIP DATA SECURITY APPLIANCE AND METHODS OF OPERATING THE SAME

RELATED APPLICATIONS

This application claims priority to U.S. Provisional Application No. 62/145,353 filed Apr. 9, 2015, and U.S. Provisional Application No. 62/152,627 filed Apr. 24, 2015, and the entire content of both prior filed applications is incorporated by reference herein.

FIELD

Embodiments of the invention relate to data security. In particular, embodiments of the invention relate to appliances used in data security systems.

BACKGROUND

Data security involves the protection of data (e.g., through isolation and access control mechanisms) during phases of a data lifecycle that includes generation, transfer, storage, and use. Some data security systems rely solely on software-based mechanisms (e.g., generally provided by operating systems) for data isolation and data access control. As operating system software complexity rises, the likelihood of implementation flaws that can be exploited to compromise data security (e.g., across the entire system) also rises. Also, as system connectivity rises, the opportunity for remote exploitation also rises. As a result, software-based data security mechanisms are increasingly vulnerable to targeted attacks originating from anywhere in the world.

SUMMARY

Embodiments of the invention provide an apparatus referred to herein as a system-on-chip data security appliance ("SoC-DSA"). In one embodiment, the SoC-DSA includes data security mechanisms fully enclosed within the protection boundary afforded by the physical boundary of a single chip. In some embodiments, isolation and access control features are hidden within an on-chip field-programmable gate array ("FPGA"). The isolation and access control features can be implemented such that they are not visible to or alterable by software executing on the processing cores of the SoC-DSA, which provides for continued data security even in the presence of software exploitation, such as a malicious implant, that otherwise compromises data security in software-only systems. The SoC-DSA can be used to enhance data security in existing data security devices and protocols, such as high assurance guards ("HAGs"), and can be used to create new types of security models, termed trusted human data interactions ("HDIs") that designate how a human interacts with data to achieve a required level of privacy.

One embodiment provides a SoC-DSA. The SoC-DSA includes a single-chip device defining a protected boundary co-incident with a boundary of the single-chip device. The SoC-DSA also includes a first communication interface, a second communication interface, and an electronic processor located within the protected boundary. In addition, the SoC-DSA includes a cryptographic component located within the protected boundary, a data transfer control component located within the protection boundary, and memory located within the protected boundary storing data. The electronic processor is configured to perform at least one of encrypting and decrypting data appearing on the first communication interface using the cryptographic component and subsequently perform, based on data stored in the memory, at least one of dropping, modifying, and transferring the data to the second communication interface using the data transfer control component.

Other aspects of the invention will become apparent by consideration of the detailed description and accompanying drawings.

DETAILED DESCRIPTION

Figure 1:
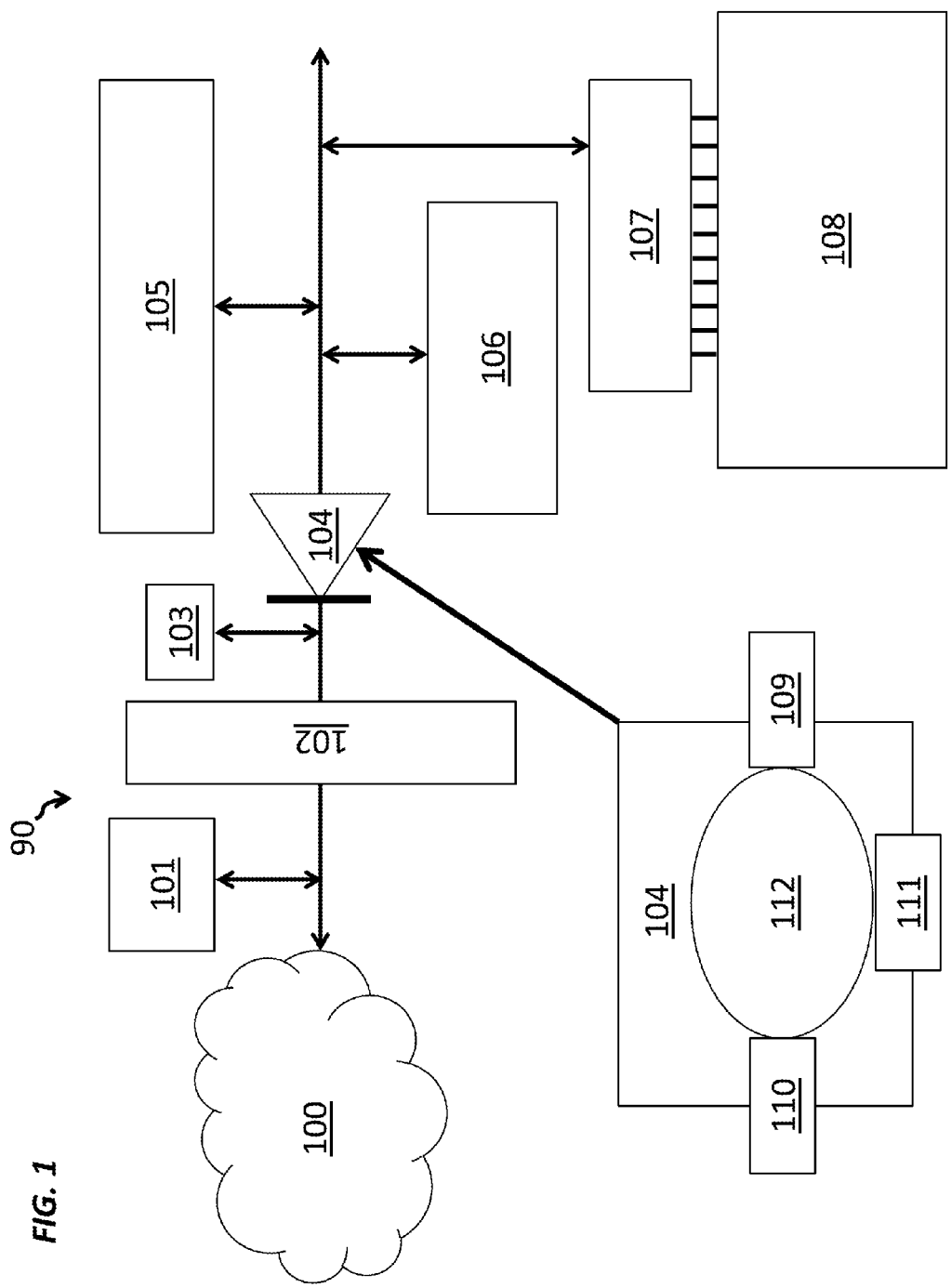
FIG. 1 schematically illustrates a network architecture including a high assurance guard ("HAG").

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Furthermore, and as described in subsequent paragraphs, the specific configurations illustrated in the drawings are intended to exemplify embodiments of the invention, it being understood that other alternative configurations are possible.

A high assurance guard ("HAG") is a computer system component that provides an interface between a sensitive "high-side" network and a less-sensitive "low-side" network, such as the Internet. A HAG provides a controlled interface that protects sensitive connections, files, data, and applications from inadvertent disclosure. Typically, HAGs are implemented as computers that enforce protection at the operating system level by intercepting traffic and placing constraints on information flow across the network boundary. For example, FIG. 1 schematically illustrates a network 90 at an industrial facility, such as power or chemical plant, that includes a HAG.

As illustrated in FIG. 1, the network 90 includes a demilitarized zone ("DMZ") 101 that provides an information network facing the Internet 100. The DMZ 101 may include multiple isolated servers. The network 90 also includes a firewall 102 to create a protected environment. The network 90 can also include an intrusion detection system ("IDS") 103 that monitors network activities for malicious activity.

As illustrated in FIG. 1, the network 90 also includes one or more administration and business services 105, human machine interfaces ("HMIs") 106 (e.g., hosted on workstations), supervisory control and data acquisition ("SCADA") controllers 107, or a combination thereof, which, may be within the protected environment (e.g., on an opposite side of the firewall 102 from the DMZ 101). The SCADA controllers 107 may be connected to critical infrastructure 108.

The network 90 also includes a HAG 104. The HAG 104 can include two separate network interface cards ("NICs"). A first NIC 109 can be associated with the "high-side" of the HAG 104 and a second NIC 110 can be associated with the "low-side of the HAG 104. In some embodiments, the HAG 104 also includes a third NIC 111 that provides an out-of-band connection to the HAG 104, which can be used for maintenance purposes, such as updating filtering rules applied by the traffic inspection engine 112 included in the HAG 104. In some embodiments, the HAG 104 implements different filtering rules in each direction (e.g., traffic from the "high-side" interface to the "low-side" interface and vice versa) and can also implement different rules based on a current level of perceived threat.

An adversary can gain a persistent point of presence, sometimes termed an advanced persistent threat ("APT"), within the network 90 at the DMZ 101, the IDS 103, the administration and business services 105, and the HMIs 106 using a wide variety of attack vectors. Protections at each of these locations (and at the HAG 104) are typically provided by the security functions of the underlying operating systems. As a result, if an adversary gains kernel-level (or administrator-level) access at any of these locations, the adversary can hide within the network and carry out malicious activities, including damage to the critical infrastructure 108, data export, denial of service, or remote control export. One challenge in many networks is to ensure that regardless of where an adversary gains kernel-level access, the adversary is unable to impact the message transport policy set at the HAG 104.

A HAG can be implemented using a system-on-chip data security appliance ("SoC-DSA") to address this and other challenges. A HAG implemented using a SoC-DSA can be referred to herein as a SoC-DSA HAG. As described in more detail below, a HAG can be implemented using a SoC-DSA in multiple ways. Also, unlike a traditional HAG, in some embodiments, multiple SoC-DSA HAGs can be used in a system (e.g., at the network interface to each system or component within the network) (e.g., based on its cost and form factor). The filtering rules applied by a SoC-DSA HAG can be updated or applied through an optional out-of-band channel.

Figure 2:
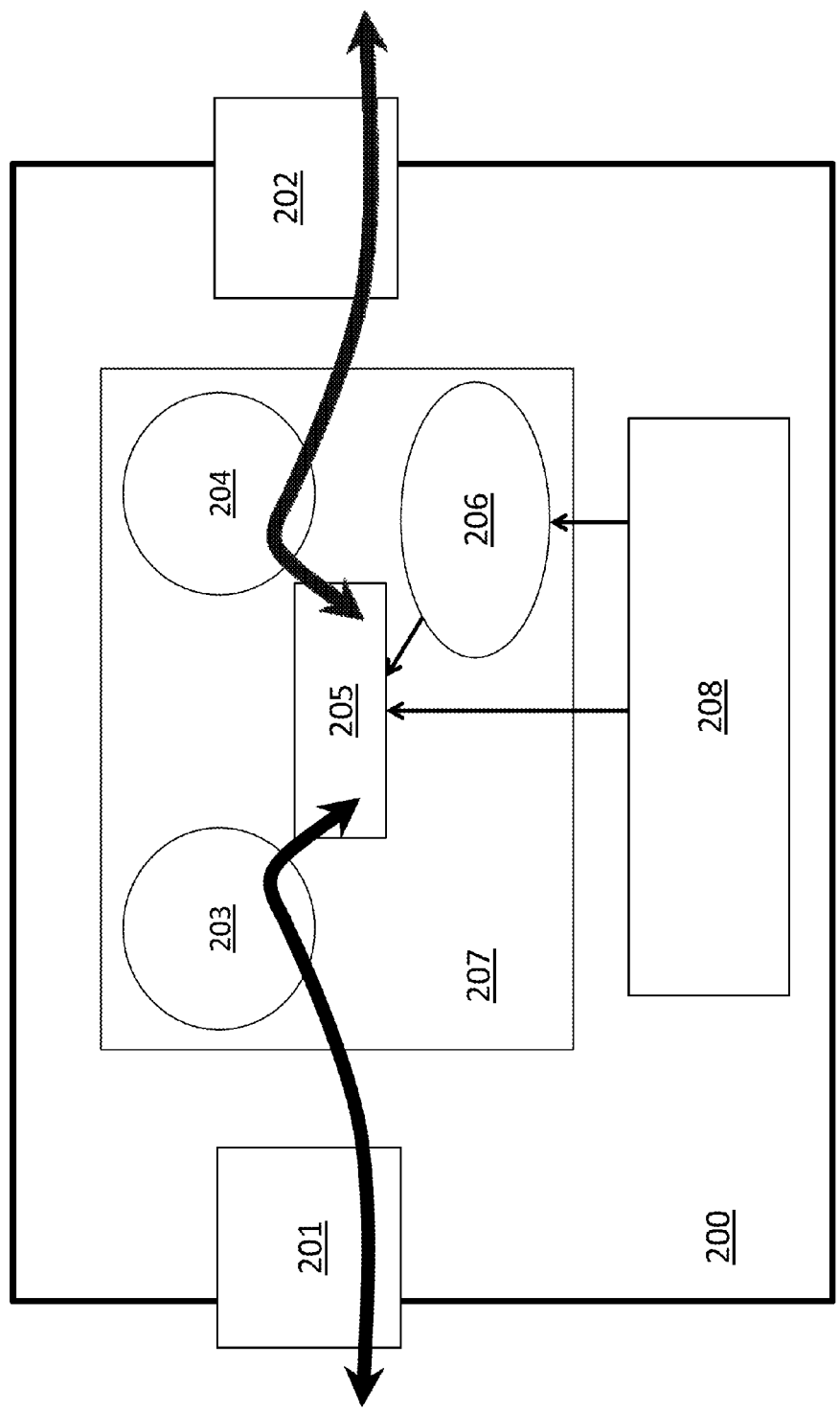
FIG. 2 is a block diagram of a hardware-enabled transfer method implementation of a HAG using a system-on-chip data security appliance ("SoC-DSA").

One way of implementing a HAG using a SoC-DSA uses a hardware-enabled transfer method. FIG. 2 illustrates this implementation according to some embodiments. In some embodiments, this implementation provides flexibility in updating the rules associated with a traffic inspection engine of the HAG. As illustrated in FIG. 2, in this implementation, the SoC-DSA HAG includes a single-chip device 200 that includes one or more electronic processors performing the functionality described herein. The electronic processors are located within the physical chip boundary of the single-chip device 200. In some embodiments, the physical chip boundary of the single-chip device 200 establishes a protected boundary for the SoC-DSA HAG. Thus, the protected boundary of the SoC-DSA HAG is co-incident with the physical boundary of the single-chip device 200. The SoC-DSA HAG can be operated under a battery power supply, an electrical power supply, or a combination thereof.

In the embodiment illustrated in FIG. 2, the electronic processors include one or more processing cores 207. Although not illustrated in FIG. 2, the SoC-DSA HAG may also include on-chip memory located within the physical chip boundary of the single-chip device 200. The on-chip memory may include random access memory ("RAM"), read-only memory ("ROM"), flash memory, field-programmable gate array ("FPGA") definitions, or a combination thereof. The on-chip memory may store a general-purpose operating system executable on the processing cores 207. In general, the on-chip memory may store data, which may include code (i.e., executable instructions), policy rules, human-data interaction rules, cryptographic keys, hash values, and other secrets.

In some embodiments, the single-chip device 200 also includes a memory interface (not shown) for communicating with one or more external memories. An external memory may be external to the protected boundary or the SoC-DSA HAG. In some embodiments, like the on-chip memory, the external memory may store data, which may include code (i.e., executable instructions), policy rules, human-data interaction rules, cryptographic keys, has values, and other secrets. Data used by the SoC-DSA HAG (i.e., the processing cores 207) and stored to an external memory may be encrypted within the protected boundary before being transmitted to the external memory (e.g., for storage in an encrypted form). Encrypting this data prior to transmission (and while stored) helps prevent memory attacks. For example, although not illustrated in FIG. 2, the SoC-DSA HAG may include one or more cryptographic components (e.g., hardware or FPGA-based cryptographic components) located within the protected boundary. Similarly, in some embodiments, the processing cores 207 are also configured to perform at least one form of reversible message operation. For example, the processing cores 207 may be configured to perform message padding and unpadding, message fragmentation and assembly, message compression and decompression. The processing cores 207 may perform the reversible message operation on data appearing (i.e., received on) a communication interface (described below) before the data is retransmitted from within the protected boundary. Performing the reversible message operation increases attacker workload.

The processing cores 207 also include a software instance of a network driver with an associated protocol stack for each interface connection of the single-chip device 200 (e.g., one or more Ethernet connections). For example, as illustrated in FIG. 2, the single-chip device 200 may include a first communication interface 201 and a second communication interface 202. Accordingly, the processing cores 207 may include a first network driver 203 associated with the first communication interface 201 and a second network driver 204 associated with the second communication interface 202. In some embodiments, the first communication interface 201 may be associated with a "low-side" of the single-chip device 200 (and, hence, referred to herein as the low-side interface 201) and the second communication interface 202 may be associated with a "high-side" of the single-chip device 200 (and, hence, referred to herein as the high-side interface 202).

In some embodiments, the single-chip device 200 also includes additional communication interfaces. For example, the single-chip device 200 may include a secure out-of-band (i.e., unobservable) interface that may be used to receive updates (e.g., to data stored in the on-chip memory or an external memory). The single-chip device 200 may also include one or more communication interfaces for connecting the SoC-DSA HAG to one or more anti-tamper sensors for facilitating hardware monitoring to help prevent physical tampering of the SoC-DSA HAG. Similarly, in some embodiments, the single-chip device 200 may include an additional communication interface connected to an input mechanism. The single-chip device 200 may use data received through the input mechanism (i.e., user input) to verify the physical presence of an authenticated operator at the SoC-DSA, such as when high-risk operations are being performed (e.g., updating memory, such as RAM, flash, or FPGA definitions) to help prevent physical tampering. Also, the single-chip device 200 may include a communication interface for storing and retrieving data, such as public keys, from a remote server.

Each communication interface may be an interface to a network or a physical interface for connecting to a field device, which may include a sensor, an actuator, or a combination thereof. A field device may also include an input mechanism for receiving user input (e.g., a button, a switch, a jumper, or a combination thereof), an output mechanism for providing user output (e.g., a light source such as a light emitting diode, a speaker, a display, or a combination thereof). For example, a field device may include an ultrasonic range sensor inserted into an orifice of a container, a potentiometer sensor attached to a mechanical level indicator, a ranging sensor determining a level of material within a container, a flow sensor, a pressure sensor, a vibration sensor, a temperature sensor, an optical sensor, a medical sensor for a medical device, a switch, a jumper, a valve, a hydraulic piston, a shutoff valve controlling a level within a container, a medical actuator, a sound generator, a light, or a display.

When the first communication interface 201, the second communication interface 202, or both interfaces interface with a network, the communication interface may include an 802.11 communication interface, a 802.15 communication interface, a cellular communication interface, a wired Ethernet communication interface, and a Bluetooth communication interface. Also, in some embodiments, the first communication interface 201, the second communication interface 202, or both communicates with an appliance via an intervening network infrastructure, wherein the appliance includes another SoC-DSA or an unbundling application.

Also, when the SoC-DSA HAG includes more than one communication interface (i.e., includes a plurality of communication interfaces), the processing cores 207 may select one of the plurality of communication interfaces to use based on a property of the communication channel used by each of the plurality of communication interfaces. The property may be availability, signal strength, signal-to-noise ratio, interference, a temporal profile, or a historical profile, or a combination thereof. In some embodiments, the processing cores 207 selects one of the plurality of communication interfaces manually, automatically, or non-deterministically (e.g., to prevent surveillance). Similarly, in some embodiments, the SoC-DSA includes a copy of a communication interface which can be used as an alternative communication path or an alternative attachment point for a field device from within the protected boundary.

In some embodiments, data (e.g., messages) enter the single-chip device 200 through one of the communication interfaces and are deposited into or removed from one or more message buffers 205 stored by the operating system. The processing cores 207 also includes a traffic inspection engine 206, which, as noted above, is a software process that applies rules, stored within the on-chip memory, to determine if a message should be transferred across the single-chip device 200, be modified, or be discarded.

In some embodiments, as illustrated in FIG. 2, the single-chip device 200 also includes a data transfer control logic 208 that provides flow control and sequencing to ensure that a message is discarded, modified, or transferred as instructed by the traffic inspection engine 206. The rule set associated with the traffic inspection engine 206 can be updated either through an authenticated secure connection over the high-side interface 202 or through a separate out-of-band connection (not shown on FIG. 2). The data transfer control logic 208 may operate (e.g., in accordance with policy or human data interaction rules stored in memory) on data appearing at a communication interface prior to retransmission of the data from within the protected boundary. Accordingly, the processing cores 207 are configured to encrypt or decrypt, using the cryptographic components described above, data appearing on a communication interface and subsequently either drop, modify, or transfer the result of encrypting or decrypting the data to another communication interface using the data transfer control logic 208 and the data stored in memory (e.g., the on-chip memory, an external memory, or the combination thereof).

Messages (i.e., data) received by the SoC-DSA HAG from an unauthentic SoC-DSA HAG over a communication interface may be ignored to prevent denial of service attacks. Also, in some embodiments, messages received on a communication interface are also constrained to have a fixed format and a fixed length to facilitate message checking by the processing cores 207. The processing cores 207 may also perform hardware monitoring for malicious attacks within the protected boundary. Furthermore, in some embodiments, the SoC-DSA HAG includes a secure boot loader located within the protected boundary. The secure boot loader provides secure software bootstrapping. Also, in some embodiments, the SoC-DSA HAG dynamically obtains configuration data, such as software, firmware, FPGA definitions or configurations, keys, hash values, policy rules, human-data interaction rules, and other secrets over a network or data interface. The configuration data may arrive in encrypted form and be decrypted within the protected boundary using the cryptographic components described above. Also, the SoC-DSA HAG may refresh (i.e., reload) its code and configurations from the on-chip memory or an external memory under manual, automatic, or non-deterministic control to prevent attack persistence. In addition, the SoC-DSA HAG may non-deterministically diversity data during a refresh by placing data (e.g., data or instructions) at random locations in memory (on-chip or external) to hinder surveillance and reverse engineering.

The hardware-enabled transfer method reinforces the security of the operating system using additional control implemented within the data transfer control logic 208 or other processor-specific security mechanisms. The method uses multiple layers of software involved in the protocol stack used to receive, process, and inspect messages. This method is flexible by allowing rules to be updated dynamically.

Figure 3:
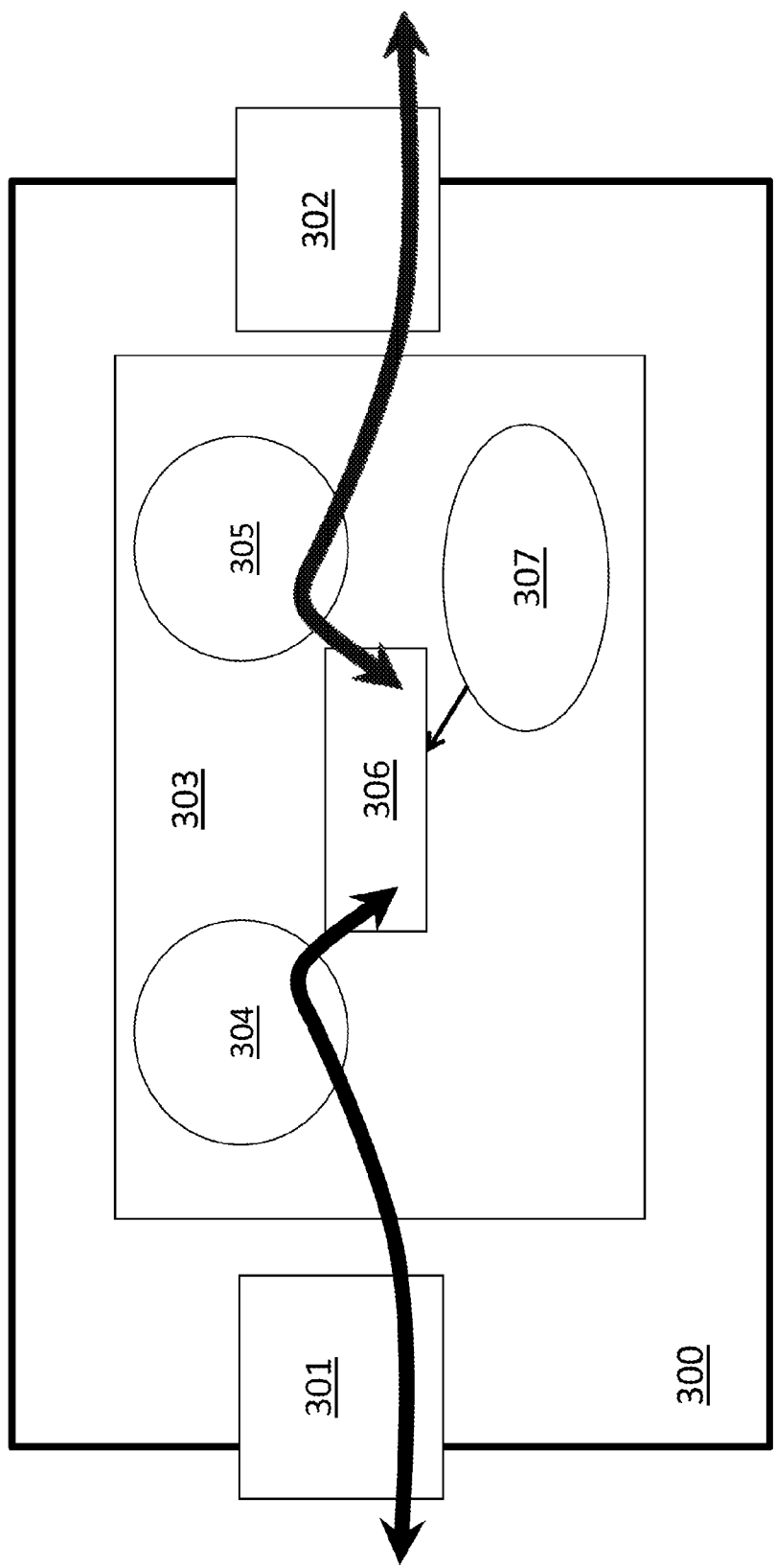
FIG. 3 is a block diagram of a hardware-only transfer method implementation of a HAG using a SoC-DSA.

Another way to implement a HAG using a SoC-DSA uses a hardware-only transfer method. FIG. 3 illustrates this type of implementation according to some embodiments. As illustrated in FIG. 3, in this implementation, the SoC-DSA HAG includes a single-chip device 300 that includes one or more electronic processors performing the functionality described herein. The electronic processors are located within the physical chip boundary of the single-chip device 300. In some embodiments, the physical chip boundary of the single-chip device 300 establishes a protected boundary for the SoC-DSA HAG. Thus, the protected boundary of the SoC-DSA HAG is co-incident with the physical boundary of the single-chip device 300. The SoC-DS HAG can be operated under a battery power supply, an electrical power supply, or a combination thereof.

In the embodiment illustrated in FIG. 3, the electronic processors include one or more programmable logic blocks 303 (e.g., FPGAs). The programmable logic blocks 303 may perform similar functionality as the processing cores 207 described above. Similarly, the SoC-DSA HAG illustrated in FIG. 3 may also include on-chip memory located within the physical chip boundary of the single-chip device 300, a memory interface for communicating with one or more external memories, and one or more cryptographic components (e.g., hardware or FPGA-based cryptographic components) located within the protected boundary as described above with respect to FIG. 2. As illustrated in FIG. 3, the programmable logic blocks 303 also include a hardware network driver with an associated protocol stack for each interface connection of the single-chip device 300 (e.g., one or more Ethernet connections). For example, as illustrated in FIG. 3, the single-chip device 300 may include a first communication interface 301 and a second communication interface 302. Accordingly, the programmable logic blocks 303 may include a first network driver 304 associated with the first communication interface 301 and a second network driver 305 associated with the second communication interface 302. In some embodiments, the single-chip device 300 also includes additional communication interfaces as described above with respect to FIG. 2.

In some embodiments, data (e.g., messages) enter the single-chip device 300 through one of the communication interfaces and are deposited into or removed from one or more message buffers 306. The programmable logic blocks 303 also include a traffic inspection engine 307, which, as noted above, is a hardware process that applies rules, stored within the on-chip memory, to determine if a message should be transferred across the single-chip device 300, be modified, or be discarded. The traffic inspection engine 307 is encoded in hardware within the programmable logic blocks 303 and applies rules encoded in logic with the programmable logic blocks 303. Messages are directly gated out onto the other side of the SoC-DSA HAG directly from the programmable logic blocks 303. Using this method provides increased packet inspection performance based on hardware acceleration. In some embodiments, the programmable logic blocks 303 also provide data transfer control logic for controlling the flow and sequencing of message to ensure that a message is discarded, modified, or transferred as instructed by the traffic inspection engine 307.

In some applications, the hardware-only transfer method is faster and more secure than the hardware-enabled transfer method. However, in some applications, the hardware-only transfer method provides less flexibility in updating rule sets associated with the traffic inspection engine 307 than the hardware-enabled transfer method. For example, in the hardware-only transfer method all packet inspection and transfer is performed in hardware, such that a software exploit cannot observe or impact message transport activities. This configuration frees the processing cores for passive data security activities, such as data transfer profiling and forensics, that do not require direct manipulation of protected data. For example, machine-learning techniques can be used to detect (e.g., in the absence of explicit rules) anomalous behavioral attributes of data transfers. These techniques can be performed locally on the SoC-DSA or in a distributed manner across an independent command and control network. The outputs can be used to configure policy determinations, elevate forensics data collection activities, or generate requests and/or alerts for human operator determinations and/or interventions.

The hardware-only transfer method can be used for unclassified industrial applications where there are no multi-level security concerns, rule sets change infrequently, and changes are primarily in response to corporate threat assessments or threat assessments designated by a national decision authority. A fixed set of predetermined rule sets can be encoded in the programmable logic blocks 303, and changes between rule sets can be effected over an out-of-band interface or the "high-side" interface as described above for the hardware-enabled transfer method.

In some embodiments, the hardware-enabled transfer method and the hardware-only transfer method represents extremes for implementing a HAG using a SoC-DSA and, in some applications, the methods represent tradeoffs in ease of implementation, cost, security, and performance. However, a multitude of intermediate methods exist in which individual attributes of the design, such as traffic inspection engine; device drivers, message buffering, synchronization and control, and out-of-band channel handing, are moved from the processing cores into the programmable logic blocks. The multi-mode transfer method represents any discrete mixture of these attributes.

New classes of data security devices are also required to address emerging concerns related to data privacy that involve differing models of how humans interact with data to achieve privacy, called human data interaction ("HDI") models. Source control of data (e.g. restricting what data is released) and end-use control of data (e.g. trusting a third-party to diligently protect data) are often insufficient methods to manage the overwhelming amount of data available today. Accordingly, new systems that enable data producers to efficiently secure data and enforce authorized data use are needed. These systems must provide mechanisms for expressing data usage policies and for associating data use polices with secured data. These systems must also provide mechanisms that allow users to interact with data in a controlled manner even in the presence of compromised software.

Multiple methods exist for building such systems on the SoC-DSA. One system could employ a SoC-DSA at a data source and at each user of the data source. Using this system, data producers could label sections of data with arbitrary markers (e.g., "personal," "private," "sensitive," "classified," " "non-disclosure agreement" or "NDA," "medical record," "identification," etc.) and associate high-level intention (policies) with the data, such as "only friends may view 'private' data," "active non-disclosure agreement required to view 'NDA' data," or "secret clearance required to view 'classified' data."

For example, in some embodiments, when the SoC-DSA powers on, it automatically generates a public and private key, a default set of policy rules, and advertises its public key on a public server. The private key may be held internally within a programmable logic block (e.g., FPGA logic), which is hidden in hardware. Any data (e.g., document) that transits the SoC-DSA will be processed according to the applicable data policy to determine if the destination specified for the document is authorized to access the document. If the destination is allowed access, the SoC-DSA encrypts the document with the destination's public key within the protected boundary of the SoC-DSA using on-chip encryption hardware (e.g., the cryptographic components described above). The document is then wrapped with a fingerprint associated with the SoC-DSA and forwarded by the SoC-DSA.

At the destination, the inverse operations, based on public key encryption, are applied. For example, the document is decrypted with the private key of the destination and the data is made available to a consumer. Accordingly, only authorized destinations will be able to access high-value, private data and check the fingerprint, which provides confidentiality, integrity, authentication, and non-repudiation within the protected boundary of the device.

In some embodiments, a data producer can decide whether to allow the use of an unbundling application (which can have attendant insecurities) to decrypt and process documents. Alternatively, the processing cores on the consuming SoC-DSA can be configured to execute user code against protected data using privacy-protecting computational techniques approved by the data producer. For example, a data set can contain medical records containing sensitive patient identification information fields and private history for each patient, and the SoC-DSA can be configured to fully decrypt the medical record into on-chip memory resources accessible exclusively by the FPGA logic but only share certain classifications of the data (e.g., data labeled "private" but not data labeled "sensitive") with user code executing on the on-chip cores. In some embodiments, data security policy may additionally be applied automatically by SoC-DSAs used by data producers or data users. For example, a dictionary engine in the FPGA logic could be configured to prevent any data in fields not shared with user code (e.g., marked as "sensitive"), such as patient name, SSN, data of birth, address, and gender, from being disclosed even if such data is present in otherwise shareable fields. Techniques such as this would allow groups or corporations to set higher level policies that over-ride personal protection policies specified by the privacy-protected user.

HDI models can also be implemented by SoC-DSA HAGs to create a system that provides both data transfer (e.g. between networks) security and data access security mechanisms. Similarly, a distributed system of SoC-DSAs could work collaboratively to provide data protection at all phases of the data lifecycle. For example, SoC-DSAs co-located with data generation sources (e.g. sensors and data entry devices) and consumers (e.g. actuators, analytics algorithms, and HDI interfaces) provides protection at endpoints, and SoC-DSAs at network transitions (e.g. HAGs, firewalls, routers) provide protection in transit. Transparent encryption processes at the source and destination endpoints create trusted data security storage at all points between.

Coordinated attacks on data security systems rely on techniques beyond direct exploitation of protection devices. Open-source and covert operations can also target people, processes, and organizations. Innocuous unclassified documents, such as training manuals, purchase orders, subcomponent specifications, subcontracts, logistics and travel documents, when combined through automated document analysis, mass human inspection, pattern-of-life analysis, and social group analysis likely provide a cohesive picture of sensitive data, which allows collection efforts to be focused. However, distributed systems of SoC-DSAs can increase the collection workload associated with these methods through fragmentation, communication diversity, zoning, replication, decoy, vacuous production, and document shaping techniques.

For example, one way to communicate a document is to encrypt it in its entirety, wrap the document with a fingerprint for storage, and perform the inverse operations at a destination or receiver to gain access to the information. Fragmentation methods non-deterministically fragment a document into pieces of random size (which can optionally be packed with random garbage to improve its diversity due to encryption), and the individual pieces can be subjected to the same methodologies at the SoC-DSA as a complete document. Accordingly, to collect private data requires that all of the pieces are intercepted, decrypted, trimmed, and assembled, which increases collection workload.

The availability of alternative communication modalities also allows communication diversity methods to be implemented on the SoC-DSA. Furthermore, when coupled with fragmentation, communication diversity methods allow fragments of a document to be communicated using differing modalities. Accordingly, to collect private data all fragments in all communications are intercepted, decrypted, trimmed, and assembled, which further increases the collection workload.

Also, although it is possible for a network to store all fragments at a single location, an alternative storage method includes using zoning methods to specify, either at SoC-DSA start-up or dynamically, a variety of alternative storage areas or zones hosted by different data storage provider services or at unique locations within a network. Collection workload is again increased because violating the data access security requires collection of data in all zones. Furthermore, to protect against storage medium outages, coordinated replication methods can replicate fragments across alternative zones, managing the replication scheme across the SoC-DSAs, so that document re-creation is possible even during isolated network outages, scheduled maintenance, and other transient concerns.

Replication and fragmentation can also use decoy methods to inject garbage decoy fragments into data, which is discernible only within the protected boundary of the SoC-DSA. Again, this increases collection workload by non-deterministically introducing additional information that must be discerned and filtered.

One method for discerning the structure of a network or of high-value members within a network includes analyzing the types and frequency of information exchanged between individuals. This form of analysis yields a graph in which each node is a person, each arc is a communication, and the degree of incoming edges represents a person's importance within the organization. This form of analysis can be used to focus collection on particular individuals within an organization. However, using vacuous decoy methods across the distributed SoC-DSA system can intentionally cause the resulting graph from this analysis to miss-represent the communication structure across the system, which increases collection workload. This method can also shape collection along particular avenues, which can be used to detect collection activities.

Automated document understanding systems can use a variety of techniques to determine the importance of a private document. These include, but are not limited to, filtering based on keywords and phrases, word frequency analysis based on the underlying language, and semantic analysis based on linguistic constructs. The primary assumption underlying this approach, however, is that the documents being analyzed are well formed in some sense (e.g., they are expressed in some language or some specific subset of a language, such as military jargon). Document shaping methods can frustrate collection efforts by injecting random sequences of random words and phrases in important documents or well-formed vacuous important phases in unimportant documents. In some applications, these operations can be added transparently across the distributed SoC-DSA system to raise the collection workload.

Mechanisms can also be used to harden SoC-DSA devices beyond the protections described above. For example, in some embodiments, on-chip peripheral interfaces can be used to provide tamper protection by interfacing directly to external anti-tamper sensors. For example, as noted above, the on-chip memory can allow secure boot and integrity checking to be conducted within the chip-boundary. Also, in some embodiments, the base of trust in the operating system can be refreshed to prevent persistence (e.g., by reloading the operating system from a read-only source on a scheduled basis or at the onset of tactical operations). During a refresh, the binary image of the operating systems code used by the device can be changed each time the device bootstraps. This diversified loading process helps eliminates return-oriented programming and helps deny adversaries the opportunity to perform surveillance and reverse engineering. All of these techniques increase the workload required for an attacker to compromise a software component within the device (e.g., for the purpose of rendering it inoperable or compromising its core functionality). It should be understood that applications of the invention may or may not incorporate any or all of these offerings or other optimizations.

The SoC-DSA provides data security by guaranteeing isolation and control of data security mechanisms in a manner that prevents observation and tampering from the processing cores. This functionality is facilitated by implementing isolation and control within the FPGA logic. In particular, the SoC-DSA architecture provides hardware to provide for boot-time only configuration of the FPGA logic (e.g., from a trusted (encrypted and signed) image that is stored in a read-only persistent memory store). Once the FPGA logic is configured, the FPGA logic configuration is rendered inaccessible from the processing cores using mechanisms controlled exclusively by the FPGA logic. When processing core modification of data security mechanisms is allowed, interfaces for any such modification are controlled by the FPGA logic.

Figure 4:
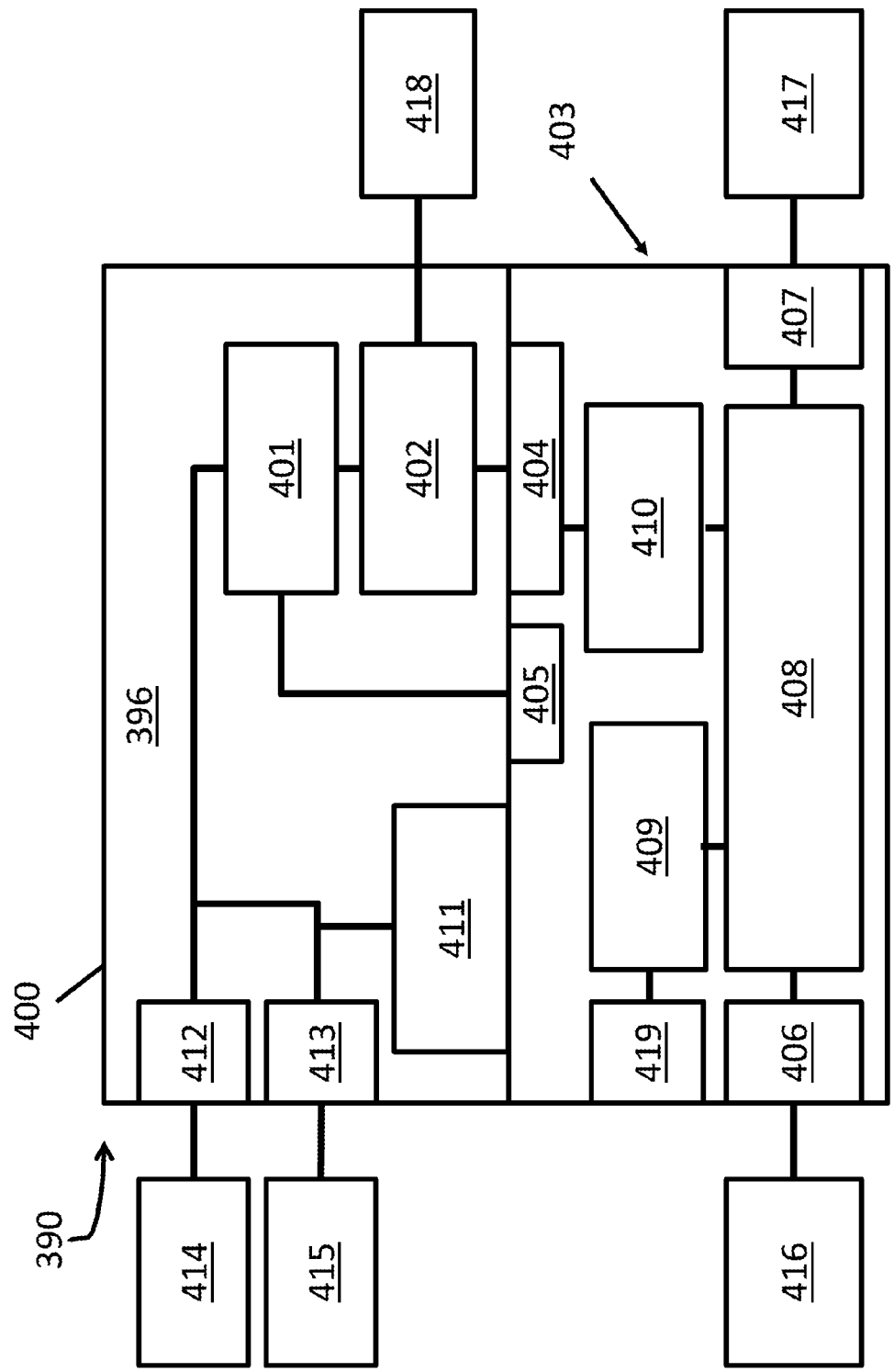
FIG. 4 is a block diagram of a SoC-DSA.

For example, FIG. 4 is a block diagram of a SoC-DSA 390 according to one embodiment. The SoC-DSA 390 generally includes multiple components collocated on a common die, protected within a common physical boundary 400 of a chip 396. The SoC-DSA 390 includes one or more dedicated processing cores 401 (e.g., Intel XEON processors or ARM Cortex-A processors) and one or more on-chip random access memory ("RAM") stores 402. The SoC-DSA 390 can optionally include one or more off-chip RAM stores 418 for unprotected data and/or code or for storing protected data and/or code in encrypted form. The SoC-DSA 390 also includes a control block 413 for a non-volatile memory store 415 where encrypted application images and data stores can be stored.

In some embodiments, the SoC-DSA 390 includes one or more network interface control blocks 412 for network connectivity between the processing cores 401 and one or more network connectivity options 414, including, but not limited, to radio frequency ("RF") (e.g., 802.11, 802.15.X, ISM band proprietary radios, etc.), wired Ethernet (e.g., gigabit Ethernet), optical (e.g., ATM over fiber), and other communications modalities.

A region of the SoC-DSA 390 (a region of the die) includes FPGA logic 403. One or more FPGA-controlled memory interfaces 404, controlled by the FPGA logic 403, provide resources instantiated within the FPGA to the processing cores 401 and provide for RAM store 402 data transfer and storage between the processing cores 401 and the FPGA logic 403. An FPGA configuration interface 405, controlled by the FPGA logic 403, allows the FPGA logic 403 to be configured by the processing cores 401 (i.e., if allowed by the FPGA logic 403).

The SoC-DSA 390 also includes a hardware cryptographic engine 411 and associated protected key stores used for trusted boot processes. On system start up, on-chip, read-only bootloader code extracts both processing core application images and FPGA logic configuration bit files from non-volatile memory store 415. The on-chip boot loader authenticates and decrypts first-stage boot application code into RAM stores 402, 418 and the bit file configuration into the FPGA control plane 408. The hardware cryptographic engine 411 is then available to applications running on the SoC-DSA 390.

The SoC-DSA 390 also includes one or more network interface control blocks 406 for direct network connectivity between network connectivity options 416, including, but not limited to, radio frequency ("RF") (e.g., 802.11, 802.15.X, ISM band proprietary radios, etc.), wired Ethernet (e.g., gigabit Ethernet), optical (e.g., ATM over fiber), and other communications modalities. Another network interface control block 407 optionally provides direct network connectivity between a second set of network connectivity options 417. The FPGA logic 403 can provide isolation guarantee between the network interface control blocks 406 and 407.

The FPGA logic 403 also makes the RAM store 409 accessible only by the FPGA logic 403. Anti-tamper logic 419 and other hardware security mechanisms available in specific embodiments of the SoC-DSA 390 can also provide automated wiping of the RAM store 409 if a tamper or security event is detected.

Data transfer control can be implemented using one or more of the network interface control blocks 406, 407 (supporting one or more network interfaces each 416, 417) using a FPGA control plane 408 implemented within the FPGA logic 403. The FPGA control plane 408 is isolated from observation and manipulation by the processing cores 401 except where explicitly allowed through FPGA-controlled, application defined logic 410 using FPGA-controlled memory interfaces 404 to the processing cores 401 and RAM stores 402, 418.

Data access control can be implemented using one or more of the network interface control blocks 412, 406, 407 with protected data unbundling occurring only within FPGA control plane 408 in the FPGA-controlled, application defined RAM store 409. Access control is then facilitated through FPGA-controlled, application defined logic 410 using FPGA-controlled memory interfaces 404 to the processing cores 401 and RAM stores 402, 418.

Silicon implementations for the SoC-DSA 390 can include the Xilinx Zynq, Xilinx UltraScale-mpSoC, and Altera HPS product families.

In one embodiment of the SoC-DSA 390, a full-featured operating system, such as FreeBSD, is executed on the processing cores 401, and one or more network connectivity options 414 are supported by the network interface control block 412. One network interface provides the "high-side" network connection and the other network interface provides the "low-side" network connection. In this embodiment, network traffic is processed by the processing cores 401 and buffered in the RAM store 402 but is only transferred across the FPGA control plane 408.

In another embodiment, a full-featured operating system, such as FreeBSD, is executed on the processing cores 401, one or more network connectivity options 414 are supported by the network interface control block 412, and the one or more network connectivity options 416 are supported by the network interface control block 406. In this embodiment, network traffic is processed by a combination of the processing cores 401 and the FPGA control plane 408, the FPGA RAM store 409, and the FPGA policy engine 410, but transfer between the two collections of network connectivity options 414, 416 only occurs across the FPGA control plane 408.

In another embodiment, one or more network connectivity options 416 are supported by the network interface control block 406 and the one or more network connectivity options 417 are supported by the network interface control block 407. All data transfer between isolated network interface control blocks 406, 407, including message inspection and policy enforcement, occurs within the FPGA control plane 408 using the RAM store 409. In some embodiments, the FPGA control plane 408 discloses authorized information about data and data transfer activities using FPGA-controlled, application defined logic 410 and using FPGA-controlled memory interfaces 404 to the processing cores 401 and RAM stores 402, 418. Additional algorithms, such as behavioral anomaly detection and advanced forensics, can then be performed by the processing cores 401.

In some embodiments, the FPGA control plane 408 provides, in addition to basic message transfer between interfaces, first-line policy enforcement primitives including source and destination access control list enforcement and baseline statistics gathering including source and destination address, port, message size and other attributes available in standard message transport packet formats.

In some embodiments, the processing cores 401 run a full-featured operating system, such as FreeBSD, and provide network connectivity using the network interface control block 412 and associated network connectivity options 414. In this embodiment, the FPGA control plane 408 can include public-private key generation capabilities that, on system start up, generate and register a public key with a remote registry (e.g., a remote server). Data access requests may be supported through the transfer of an authorized, released bundle of data (i.e., encrypted with the SoC-DSA's public key) into memory stores 415, 418, 402. The FPGA control plane 408 unbundles the data into FPGA RAM store 409 and exports authorized releases of the data via the FPGA-controlled, application defined logic 410 using FPGA-controlled memory interfaces 404 to the processing cores 401, on-chip RAM store 402, and (if allowed by the security policy) off-chip RAM store 418.

Figure 5:
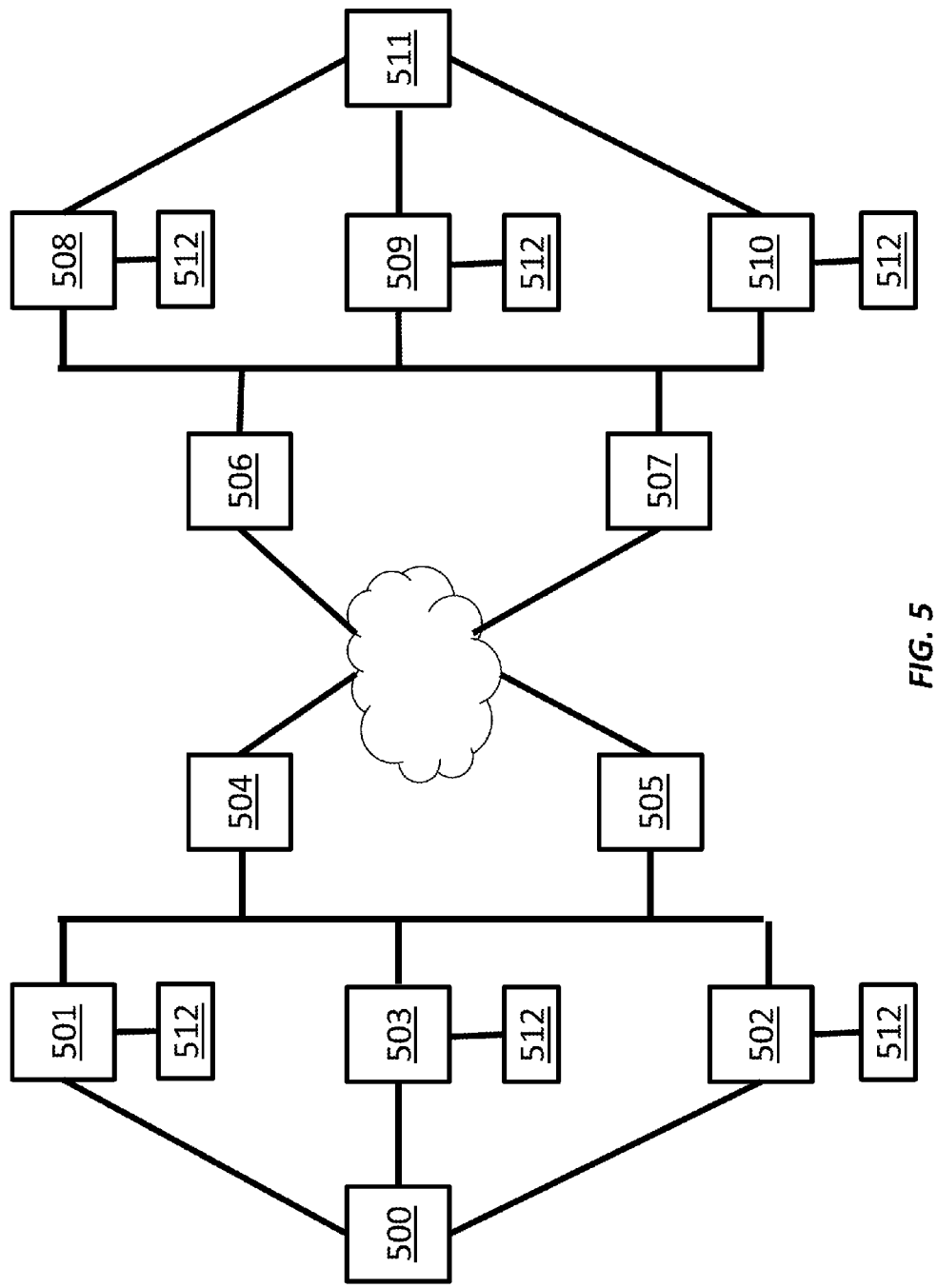
FIG. 5 is a block diagram of a distributed SoC-DSA network architecture.

FIG. 5 is a block diagram of a distributed SoC-DSA network architecture according to one embodiment. In this embodiment, a plurality of SoC-DSAs 500, 501, 502, 503, 504, 505, 506, 507, 508, 509, 510, 511 are deployed across the network infrastructure. SoC-DSAs associated with one or more data producers 500 and one or more data consumers 511 provide initial encryption and decryption activities at the endpoints. The SoC-DSAs at a data producer 500 can also specify a data access policy for the associated data, and the SoC-DSAs at a data consumer 511 can enforce the specified data policy. Edge-of-network SoC-DSAs 504, 505, 506, 507 provide first-tier firewall mechanisms as well as communication diversity across public networks. SoC-DSAs internal to producer networks 501, 502, 503 and consumer networks 508, 509, 510 provide HAG-type functionality as methods for increasing observation workload.

Fragmentation and diversity methods can be supported by coordination across the producer's SoC-DSA 500 and internal SoC-DSAs 501, 502, 503. Zoning, replication, decoy, and document shaping methods can also be supported by coordination across the internal SoC-DSAs 501, 502, 503.

The same techniques can be leveraged within the consumer's network to increase observation workload. In some embodiments, prior to use, reassembly and injected data disposal occurs at the consumer's internal dedicated SoC-DSA 511 in coordination with the consumer's internal SoC-DSAs 508, 509, 510.

The system of SoC-DSAs illustrated in FIG. 5 may communicate over an intermediate network infrastructure that connects the plurality of SoC-DSAs through the communication interface of each of the plurality of SoC-DSAs. Also, in some embodiments, as noted above, one or more unbundling applications 512 may communicate with one or more of the plurality of SoC-DSAs through the intermediary network infrastructure. Also, in some embodiments, at least one of the plurality of SoC-DSAs is designated as a zone for message operations associated with a subset of the plurality of SoC-DSAs.

Various features and advantages of the invention are set forth in the following claims.

What is claimed is:

1. A system-on-chip data security appliance (SoC-DSA) comprising:
    a single-chip device defining a protected boundary coincident with a boundary of the single-chip device;
    a first communication interface;
    a second communication interface;
    an electronic processor located within the protected boundary;
    a cryptographic component located within the protected boundary;
    a data transfer control component located within the protection boundary; and
    memory located within the protected boundary, the memory storing data,
    wherein the electronic processor is configured to perform at least one of encrypting and decrypting data appearing on the first communication interface using the cryptographic component and subsequently perform, based on data stored in the memory, at least one of dropping, modifying, and transferring the data to the second communication interface using the data transfer control component.

2. The SoC-DSA of claim 1, further comprising a power supply including at least one selected from the group consisting of a battery power supply and an electrical power supply.

3. The SoC-DSA of claim 1, further comprising a memory interface to an external memory located outside the protected boundary, wherein the electronic processor is configured to encrypt data stored to the external memory using the cryptographic component within the protected boundary prior to transferring the data to the external memory through the memory interface.

4. The SoC-DSA of claim 1, further comprising a third communication interface receiving secure out-of-band updates to data stored in at least one of the memory and an external memory located outside the protection boundary.

5. The SoC-DSA of claim 1, further comprising a third communication interface connecting with an anti-tamper sensor performing hardware monitoring for physical tampering.

6. The SoC-DSA of claim 1, further comprising a third communication interface receiving user input for verifying a physical presence of an authenticated operator.

7. The SoC-DSA of claim 1, further comprising a third communication interface communicating with a remote server for storing and retrieving public keys.

8. The SoC-DSA of claim 1, further comprising a secure boot loader located within the protected boundary, the secure boot loader providing secure software bootstrapping.

9. The SoC-DSA of claim 1, wherein the SoC-DSA dynamically obtains configuration data including at least one selected from the group consisting of software, firmware, a field programmable gate array configuration, a key, a hash value, a policy rule, and a human-data interaction rule over a data interface, wherein the configuration data is received in encrypted form and is decrypted within the protected boundary using the cryptographic component.

10. The SoC-DSA of claim 1, wherein the electronic processor is further configured to perform a reversible message operation, including performing at least one selected from the group consisting of message padding and unpadding, message fragmentation and assembly, message compression and decompression, on data appearing at at least one selected from the group consisting of the first communication interface and the second communication interface prior to re-transmission of the data from within the protected boundary.

11. The SoC-DSA of claim 1, wherein the electronic processor is further configured to operate the data transfer control component, in accordance with data stored in the memory, on data appearing at at least one selected from the group consisting of the first communication interface and the second communication interface prior to retransmission from within the protected boundary.

12. The SoC-DSA of claim 1, wherein at least one selected from the group consisting of the first communication interface and the second communication interface includes at least one selected from the group consisting of a 802.11 communication interface, a 802.15 communication interface, a cellular communication interface, a wired Ethernet communication interface, and a Bluetooth communication interface, and at least one selected from the group consisting of the first communication interface and the second communication interface communicates with an appliance via an intervening network infrastructure, wherein the appliance includes at least one selected from the group consisting of a second SoC-DSA and an unbundling application.

13. The SoC-DSA of claim 1, wherein a field device attached to at least one selected from the group consisting of the first communication interface and the second communication interface includes at least one selected from the group consisting of an ultrasonic range sensor inserted into an orifice of a container, a potentiometer sensor attached to a mechanical level indicator, a ranging sensor determining a level of material within a container, a flow sensor, a pressure sensor, a vibration sensor, a temperature sensor, an optical sensor, a medical sensor for a medical device, a switch, a jumper, a valve, a hydraulic piston, a shutoff valve controlling a level within a container, a medical actuator, a sound generator, a light, and a display.

14. The SoC-DSA of claim 1, wherein the first communication interface includes a plurality of communication interfaces and wherein the SoC-DSA selects one of the plurality of communication interfaces to use based on a property of a communication channel used by each of the plurality of communication interfaces, the property including at least one selected from the group consisting of availability, signal strength, signal-to-noise ratio, interference, a temporal profile, and a historical profile.

15. The SoC-DSA of claim 14, wherein the SoC-DSA selects the one of the plurality of communication interfaces manually, automatically, or non-deterministically.

16. The SoC-DSA of claim 1, wherein the SoC-DSA refreshes data stored in the memory manually, automatically, or non-deterministically.

17. The SoC-DSA of claim 1, wherein the SoC-DSA refreshes data stored in the memory by placing data at random locations in the memory.

18. The SoC DSA of claim 1, further comprising a copy of the first communication interface, the copy of the first communication providing an alternative data communication path from within the protected boundary or an alternative attachment point for a field device from within the protected boundary.

19. The SoC-DSA of claim 1, wherein the electronic processor is configured to perform hardware monitoring for malicious attacks within the protected boundary.

20. The SoC-DSA of claim 1, wherein the SoC-DSA ignores communications received from a second unauthentic SoC DSA over the first communication interface or the second communication interface.

21. The SoC-DSA of claim 1, wherein the electronic processor constrains communications over the first communication interface and the second communication interface to a fixed format and a fixed length.

22. A system comprising:
a plurality of system-on-chip data security appliances (SoC-DSAs), each of the plurality of SoC-DSAs including a single-chip device defining a protected boundary co-incident with a boundary of a chip included in the single-chip device and a communication interface; and
an intermediate network infrastructure connecting the plurality of SoC-DSAs through the communication interface of each of the plurality of SoC-DSAs.

23. The system of claim 22, further comprising an unbundling application, wherein the unbundling application communicates with at least one of the plurality of SoC-DSAs through the intermediary network infrastructure.

24. The system of claim 22, wherein at least one of the plurality of SoC-DSAs is designated as a zone for message operations associated with a subset of the plurality of SoC-DSAs.

* * * * *